US009070232B2

(12) United States Patent
Kosugi

(10) Patent No.: US 9,070,232 B2
(45) Date of Patent: Jun. 30, 2015

(54) WIRELESS COMMUNICATION SYSTEM FOR VEHICLE

(75) Inventor: Masanori Kosugi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 294 days.

(21) Appl. No.: 13/212,855

(22) Filed: Aug. 18, 2011

(65) Prior Publication Data

US 2012/0062361 A1 Mar. 15, 2012

(30) Foreign Application Priority Data

Sep. 9, 2010 (JP) ................................. 2010-202057

(51) Int. Cl.
*G05B 19/00* (2006.01)
*G07C 9/00* (2006.01)

(52) U.S. Cl.
CPC .. *G07C 9/00182* (2013.01); *G07C 2009/00253* (2013.01); *G07C 2009/00555* (2013.01)

(58) Field of Classification Search
CPC ........... G07C 2009/00253; G07C 2009/00555; G07C 9/00182
USPC ........... 340/426.17, 5.72, 5.26; 701/2; 380/44
See application file for complete search history.

(56) References Cited

U.S. PATENT DOCUMENTS 5,883,443 A * 3/1999 Wilson ......................... 307/10.2
5,905,431 A * 5/1999 Mueller et al. ........... 340/426.17
6,194,991 B1 * 2/2001 Barrs et al. ................... 340/5.72
7,050,947 B2 * 5/2006 Selektor ........................ 702/189
7,231,041 B2 * 6/2007 Forest et al. .................... 380/44
2001/0015694 A1 * 8/2001 Lassle et al. ................. 340/5.26
2004/0139348 A1 * 7/2004 Norris, Jr. ...................... 713/200
2008/0136590 A1 * 6/2008 Baumgartner et al. ...... 340/5.72
2010/0090866 A1 * 4/2010 Chen et al. .................... 340/953
2011/0160935 A1 * 6/2011 Newman et al. .................. 701/2

FOREIGN PATENT DOCUMENTS

JP 2007-224663 A 9/2007
JP 2008-127894 6/2008

OTHER PUBLICATIONS

Japanese Office Action for Japanese Application No. 2010202057, dated Dec. 3, 2013. English translation not provided.

* cited by examiner

*Primary Examiner* — Benjamin C Lee
*Assistant Examiner* — Chico A Foxx
(74) *Attorney, Agent, or Firm* — Patterson Thuente Pedersen, P.A.

(57) ABSTRACT

A wireless communication system for a vehicle has a portable device that transmits a wireless signal and a vehicle-mounted device that receives the wireless signal from the portable device. Each time a switch in the portable device is turned on, the portable device updates a portable device rolling code and transmits a wireless signal including the portable device rolling code. The vehicle-mounted device receives the wireless signal through a receiver and authenticates the portable device through comparison between the portable device rolling code included in the wireless signal and the vehicle rolling code. The vehicle-mounted device locks or unlocks the vehicle door if the portable device is authenticated. When the wireless signal is received through the receiver after the most recent locking or unlocking of the vehicle door has been carried out using the mechanical key, the vehicle-mounted device locks or unlocks the vehicle door if the switch is turned on for n (n is an integral number greater than or equal to 2) times or more.

13 Claims, 11 Drawing Sheets

WIRELESS COMMUNICATION SYSTEM FOR VEHICLE

BACKGROUND OF THE INVENTION

The present invention relates to a wireless communication system for a vehicle that performs various types of control through wireless communication between a portable device and a vehicle.

As one such type of wireless communication system for a vehicle, a remote keyless entry system (an RKE system) has been known. The system allows locking or unlocking vehicle doors through manipulation of a switch mounted in a portable device. Conventionally, a system described in Japanese Laid-Open Patent Publication No. 2007-224663, for example, is known as one such RKE system. In this RKE system, each time a switch in a portable device is manipulated by the user, the value of a portable device rolling code is incremented and a wireless signal including the rolling code and a portable device identification code (ID code) is transmitted from the portable device. The wireless signal is received by a receiver mounted in the vehicle. The receiver then transmits the received wireless signal to a controller, which is installed also in the vehicle. After receiving the wireless signal, the controller compares the portable device ID code in the wireless signal with a vehicle ID code stored in a memory mounted in the controller. If the controller determines that the two ID codes match each other through the comparison, the controller compares the portable device rolling code in the wireless signal with a rolling code stored in the memory of the controller. If the portable-device rolling code is greater than the vehicle rolling code and the difference between the rolling codes is less than a predetermined threshold value, the controller determines that the portable device has been authenticated. The controller then actuates a door lock mechanism, which is mounted in each door of the vehicle, to selectively lock and unlock the door. Also at this stage, the controller stores the value of the portable device rolling code in the wireless signal by means of the memory as an update of the vehicle rolling code.

Normally, a wireless signal transmitted from a portable device can be intercepted by a third-party. In the above-described RKE system, even if a wireless signal from the portable device is intercepted by a third-party, the vehicle rolling code can be set to a value greater than the portable device rolling code carried by the intercepted wireless signal once the user locks or unlocks the doors of the vehicle using the certified portable device. As a result, even if the third-party transmits the intercepted wireless signal to the vehicle, authentication of the portable device is not established in the vehicle, and the doors of the vehicle are not unlocked. This prevents the third-party from unlawfully entering the passenger compartment and ensures a high level security for the vehicle.

However, in the RKE system, a wireless signal from the portable device may not be adequately received by the receiver in the vehicle if there is noise that can be received by the receiver. In this situation, the doors of the vehicle cannot be locked or unlocked even if the user turns on the switch of the portable device. This only updates the portable device rolling code without updating the vehicle rolling code. As a result, if a wireless signal sent from the portable device is intercepted by a third-party under this circumstance, the intercepted wireless signal includes a rolling code that is greater than the vehicle rolling code. In this case, if the vehicle moves to a site unaffected by the noise, for example, and then the third-party transmits the intercepted wireless signal to the vehicle at the site, authentication of the portable device will be established. The doors of the vehicle thus may be opened. This makes it impossible to prevent the third-party from unlawfully entering the passenger compartment.

Therefore, since the level of security in the conventional RKE system may decrease in a circumstance where there is noise that can be received by the receiver, the RKE system has room for improvement.

SUMMARY OF THE INVENTION

Accordingly, it is an objective of the present invention to provide a wireless communication system for a vehicle that ensures a high level of security.

To achieve the foregoing objective and in accordance with a first aspect of the present invention, a wireless communication system for a vehicle for locking or unlocking a vehicle door is provided. The system includes a portable device a vehicle-mounted device, and a control section. The portable device has a manually operable switch and a portable device rolling code. Each time the switch is turned on, the portable device updates the portable device rolling code and transmits a wireless signal including the portable device rolling code. The vehicle-mounted device has a receiver and a vehicle rolling code. When the wireless signal is received through the receiver, the vehicle-mounted device compares the portable device rolling code included in the wireless signal with the vehicle rolling code, authenticates the portable device based on a comparison result, and locks or unlocks the vehicle door if the portable device is authenticated. The control section is mounted in the vehicle-mounted device, and controls locking or unlocking of the vehicle door. When the control section receives the wireless signal through the receiver, the control section determines whether the most recent locking or unlocking of the vehicle door has been accomplished using a mechanical key and, if it is determined that the most recent locking or unlocking of the vehicle door has been carried out using the mechanical key, the control section locks or unlocks the vehicle door if a specific manipulation of the switch is detected.

In accordance with a second aspect of the present invention, a wireless communication system for a vehicle for locking or unlocking a vehicle door is provided. The system includes a portable device, a vehicle-mounted device, and a control section. The portable device has a manually operable switch and a portable device rolling code. Each time the switch is turned on, the portable device updates the portable device rolling code and transmits a wireless signal including the portable device rolling code. The vehicle-mounted device has a receiver and a vehicle rolling code. When the wireless signal is received through the receiver, the vehicle-mounted device compares the portable device rolling code included in the wireless signal with the vehicle rolling code, authenticates the portable device based on a comparison result, and locks or unlocks the vehicle door if the portable device is authenticated. The a control section is mounted in the vehicle-mounted device, and controls locking or unlocking of the vehicle door. The control section determines whether the vehicle door has been locked or unlocked using a mechanical key and, if it is determined that the vehicle door has been locked or unlocked using the mechanical key, the control section updates the vehicle rolling code by incrementing the vehicle rolling code by a predetermined value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

<First Embodiment>

Figure 1:
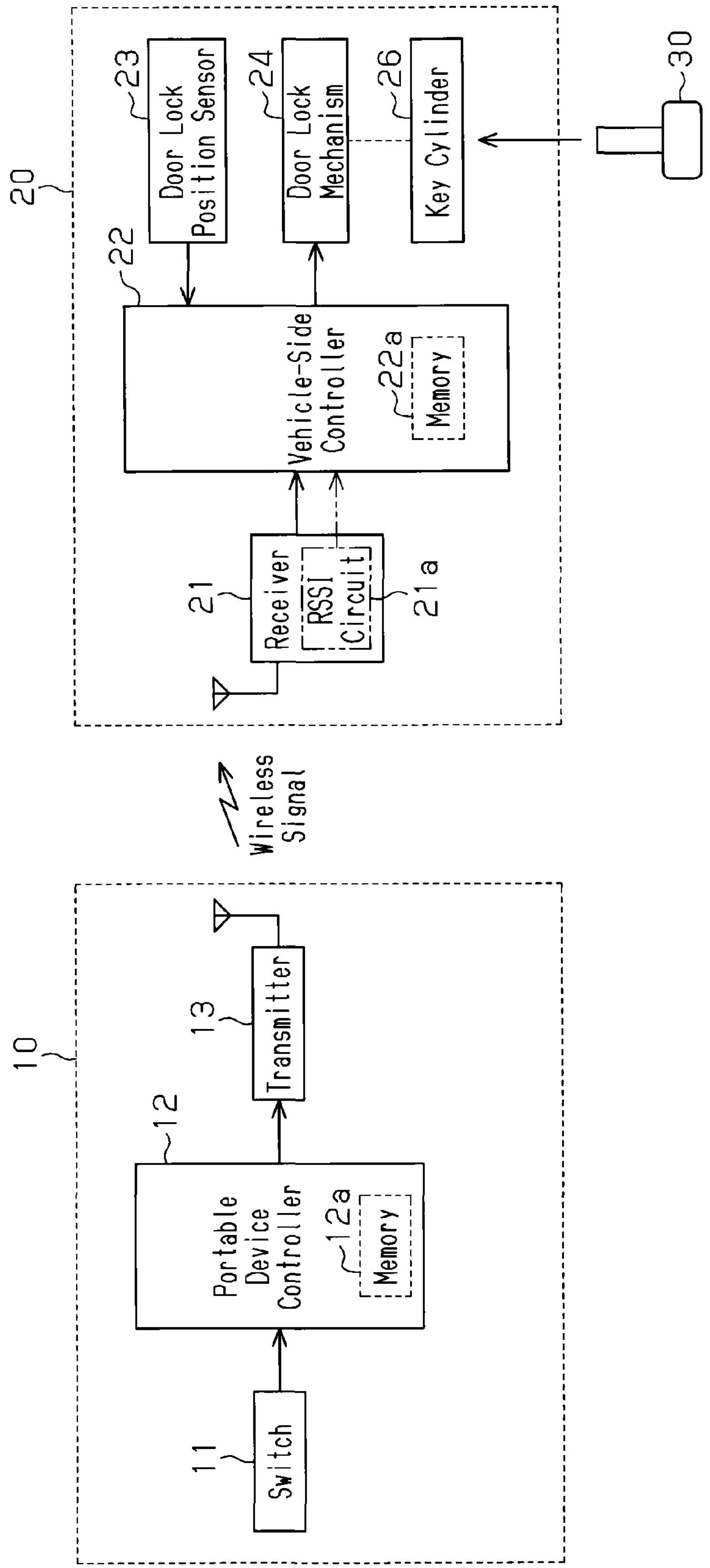
FIG. 1 is a block diagram representing a wireless communication system for a vehicle according to a first embodiment of the present invention.

A wireless communication system for a vehicle according to a first embodiment of the present invention will now be described with reference to FIGS. 1 to 5. The wireless communication system of the first embodiment is a remote keyless entry system (an RKE system), which remotely controls locking and unlocking of vehicle doors by means of a portable device. Specifically, as illustrated in FIG. 1, the wireless communication system mainly includes a portable device 10 and a vehicle-mounted device 20. The portable device 10 is carried by the user to remotely control locking or unlocking of vehicle doors. The vehicle-mounted device 20 locks or unlocks the vehicle doors through wireless communication with the portable device 10.

The portable device 10 has a switch 11, which is depressed by the user of the vehicle to perform remote control as has been described. The portable device 10 has a transmitter 13 for transmitting a wireless signal to the vehicle-mounted device 20. The portable device 10 includes a portable device controller 12, which generates a wireless signal and transmits the signal through the transmitter 13 when the switch 11 is turned on. A non-volatile memory **12*a* is incorporated in the portable device controller 12. The memory 12*a*** stores various information including, for example, a portable device rolling code Rp and a portable device identification code (ID code) IDp in advance.

The vehicle-mounted device 20 has a receiver 21, which receives the wireless signal transmitted by the portable device 10. The vehicle-mounted device 20 has a door lock position sensor 23, which detects whether the vehicle doors are in a locked state or an unlocked state. The vehicle-mounted device 20 includes a vehicle-side controller 22. An output of the door lock position sensor 23 is provided to the vehicle-side controller 22. The vehicle-side controller 22 processes the wireless signal received through the receiver 21 and controls a door lock mechanism 24, which is a control target. A non-volatile memory **22*a* is incorporated also in the vehicle-side controller 22. The memory 22*a* stores various information including, for example, a vehicle rolling code Rc and a vehicle identification code IDc in advance. A key cylinder 26, which is linked to the door lock mechanism 24 through a suitable link mechanism, is formed in each vehicle door. The vehicle door is manually locked or unlocked by inserting a mechanical key 30 into the key cylinder 26. The vehicle-side controller 22 corresponds to the control section and the door lock position sensor 23** corresponds to the locking/unlocking section.

As the user turns on the switch 11 of the portable device 10, the wireless communication system, which is configured as described above, operates in the manner described below. After the switch 11 is turned on, a manipulation signal indicating that the switch 11 has been turned on is input to the portable device controller 12. In response to the manipulation signal sent from the switch 11, the portable device controller 12 increments the value of the portable device rolling code Rp stored in the memory **12*a*. The portable device controller 12 then generates a wireless signal including the incremented portable device rolling code Rp and the portable device identification code IDp, which is stored in the memory 12*a*, and outputs the signal to the transmitter 13. The portable device 10 thus transmits the wireless signal. After the wireless signal has been transmitted, the vehicle-mounted device 20 receives the wireless signal through the receiver 21 and inputs the received signal to the vehicle-side controller 22. In response to the wireless signal, the vehicle-side controller 22 performs an authentication procedure using the information carried by the signal. Specifically, the vehicle-side controller 22 first compares the value of the portable device rolling code Rp included in the wireless signal and the value of the vehicle rolling code Rc, which is stored in the memory 22*a*. The vehicle-side controller 22** then determines whether the conditions (a1) and (a2), which are described below, are both satisfied.

(a1) The value of the portable device rolling code Rp exceeds the value of the vehicle rolling code Rc. Specifically, the expression: $Rp>Rc$ is satisfied.

(a2) The difference between the rolling codes Rp, Rc ($Rp-Rc$) is less than a predetermined threshold value (which is, for example, "100").

When the vehicle-side controller 22 determines that the conditions (a1) and (a2) are both satisfied, the vehicle-side controller 22 compares the portable device identification code IDp included in the wireless signal and the vehicle identification code IDc stored in the memory 22*a*. If the comparison shows that the two identification codes IDp and IDc match each other, the vehicle-side controller 22 determines that the portable device 10 has been authenticated. The vehicle-side controller 22 then locks or unlocks the vehicle doors through the door lock mechanisms 24. Specifically, when the vehicle-side controller 22 detects that any vehicle doors are in an unlocked state through the door lock position sensor 23, the vehicle-side controller 22 locks the vehicle door(s) through the corresponding door lock mechanisms 24. In contrast, if it is detected that any vehicle door(s) are in a locked state through the door lock position sensor 23, the vehicle-side controller 22 unlocks the vehicle door(s) through the corresponding door lock mechanism(s) 24. In other words, in the wireless communication system of the first embodiment, the vehicle doors are alternately locked and unlocked each time the user turns on the switch 11. Also, when the vehicle-side controller 22 locks or unlocks the vehicle doors through reception of a wireless signal, the vehicle-side controller 22 causes the memory 22*a* to store the value of the portable device rolling code Rp included in the wireless signal as an update of the vehicle rolling code Rc.

As has been described, in this wireless communication system, a wireless signal transmitted from the portable device 10 may not be received properly through the receiver 21 if there is noise that can be received by the receiver 21. In this situation, the vehicle doors cannot be locked or unlocked even if the switch 11 of the portable device 10 is turned on. As a result, typically, the user must use the mechanical key 30 to manually lock or unlock the vehicle doors. Accordingly, if the vehicle doors have been locked or unlocked using the mechanical key 30, it may be assumed that the receiver 21 is receiving noise, or, in other words, the wireless signal is likely to be intercepted and used to unlock the vehicle doors unlawfully.

To solve this problem, in the first embodiment, when a wireless signal is received through the receiver 21, the vehicle-side controller 22 determines whether the most recent locking or unlocking of the vehicle doors was accomplished through the mechanical key 30. Specifically, the vehicle-side controller 22 performs such determination in the manner described below. First, if the vehicle-side controller 22 detects that the vehicle doors were locked or unlocked by means of the door lock position sensor 23 despite the fact that the vehicle-side controller 22 has not locked or unlocked the vehicle doors through the aforementioned authentication, the vehicle-side controller 22 determines that the vehicle doors have been locked or unlocked using the mechanical key 30. In this case, the vehicle-side controller 22 sets a door open/close flag, which is stored in the memory 22*a*, to an ON state. In contrast, if the vehicle-side controller 22 has locked or unlocked the vehicle doors through the aforementioned authentication, the vehicle-side controller 22 sets the door open/close flag to an OFF state. If the door open/close flag is in the ON state when a wireless signal is received through the receiver 21, the vehicle-side controller 22 determines that the most recent locking or unlocking of the vehicle doors has been performed using the mechanical key 30.

In the first embodiment, when the vehicle-side controller 22 receives a wireless signal through the receiver 21 after the most recent locking or unlocking of the vehicle doors has been carried out using the mechanical key 30, the vehicle-side controller 22 locks or unlocks the vehicle doors if the switch 11 of the portable device 10 is turned on for n times or more. Specifically, as the switch 11 is manipulated n times, the portable device 10 transmits a wireless signal n times. After the vehicle-side controller 22 receives the wireless signal n times through the receiver 21, the vehicle-side controller 22 determines that the switch 11 has been turned on n times if authentication is established each of the n times. When it is determined that the switch 11 has been turned on n times, the vehicle-side controller 22 locks or unlocks the vehicle doors.

Figure 2:
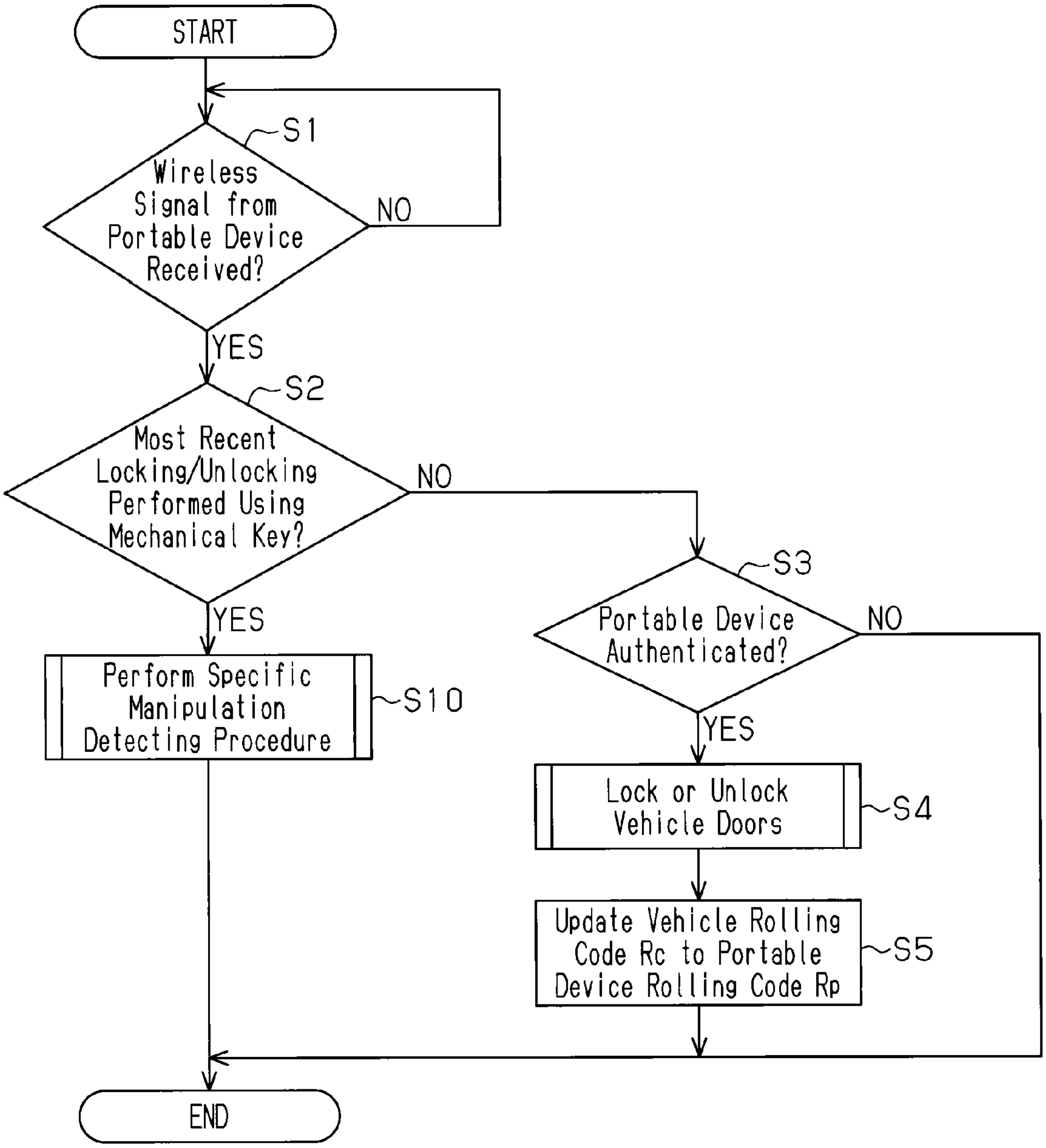
FIG. 2 is a flowchart representing the steps of a procedure for selectively locking and unlocking vehicle doors in response to a wireless signal transmitted from the portable device of the system represented in FIG. 1.

With reference to FIG. 2, the procedure for locking or unlocking the vehicle doors carried out by the vehicle-side controller 22 will hereafter be described. The procedure is performed repeatedly at predetermined calculation cycles.

As illustrated in FIG. 2, according to the procedure, the vehicle-side controller 22 monitors whether a wireless signal transmitted from the portable device 10 is received through the receiver 21 (Step S1). When it is determined that a wireless signal sent from the portable device 10 has been received (Step S1: YES), the vehicle-side controller 22 determines whether the most recent locking or unlocking of the vehicle doors has been performed using the mechanical key 30 (Step S2) with reference to the door open/close flag stored in the memory 22*a*. If it is determined that the most recent locking or unlocking of the vehicle doors has been carried out without using the mechanical key 30 (Step S2: NO), the vehicle-side controller 22 performs the above-described procedure for authenticating the portable device 10 based on the identification code and the rolling code carried by the received wireless signal and determines whether the portable device 10 is authenticated (Step S3). When the portable device 10 is authenticated (Step S3: YES), the vehicle-side controller 22 locks or unlocks the vehicle doors in the above-described manner (Step S4). The vehicle-side controller 22 then updates the vehicle rolling code Rc by the value of the portable device rolling code Rp included in the wireless signal (Step S5). After Step S5, the vehicle-side controller 22 suspends the series of procedure.

Contrastingly, if it is determined through the determination in Step S3 that the portable device 10 is not authenticated (Step S3: NO), the vehicle-side controller 22 ends the series of procedure without locking or unlocking the vehicle doors.

If it is determined that the most recent locking or unlocking of the vehicle doors has been performed using the mechanical key 30 through the determination in Step S2 (Step S2: YES), the vehicle-side controller 22 performs a specific manipulation detecting procedure (Step S10). In the specific manipulation detecting procedure, the vehicle doors are locked or unlocked if the portable device 10 has been authenticated for each of the n times by which the wireless signals have been received through the receiver 21.

Figure 3:
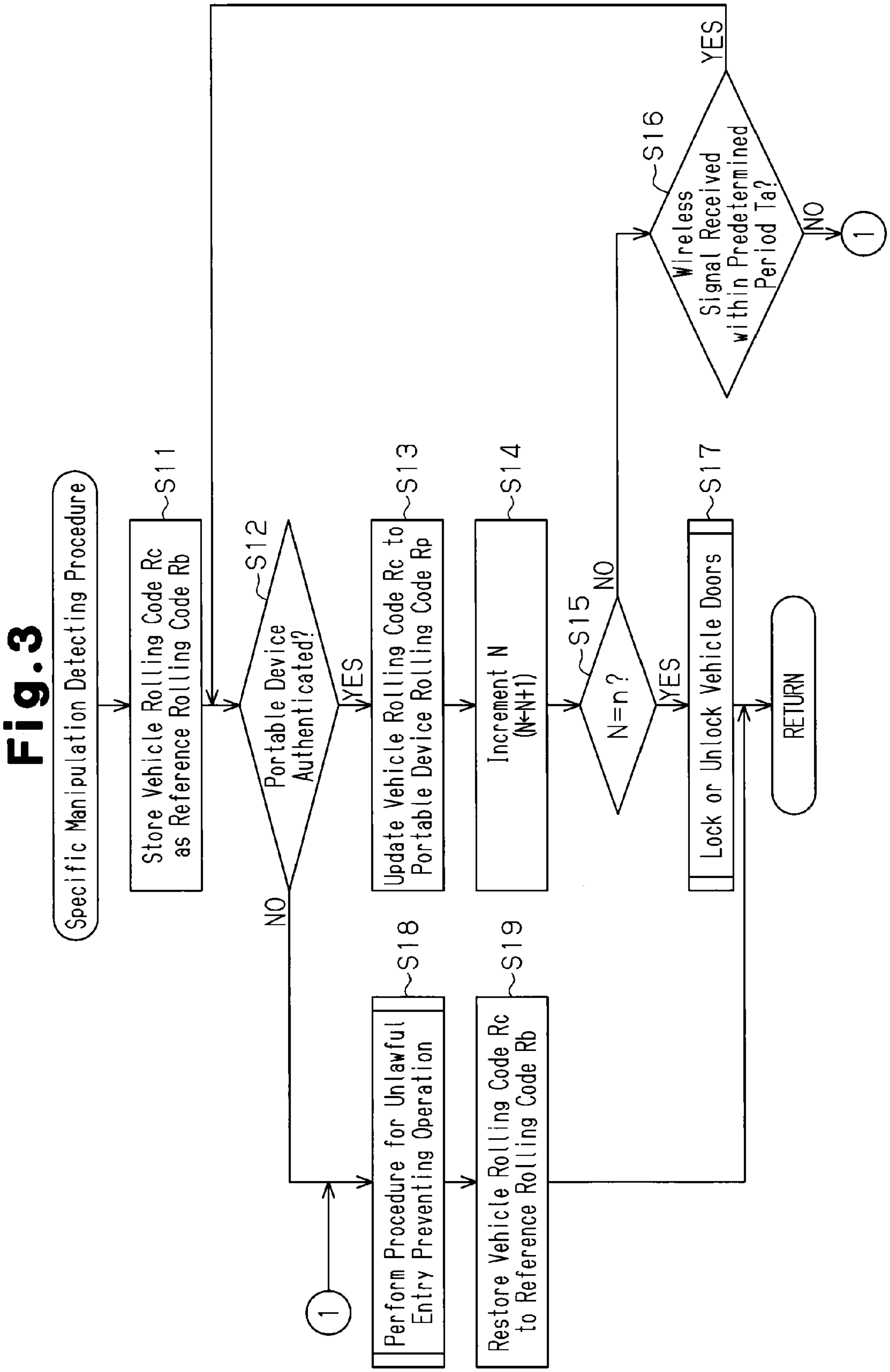
FIG. 3 is a flowchart representing the steps of a specific manipulation detecting procedure in FIG. 2.

FIG. 3 is a flowchart representing the steps of the specific manipulation detecting procedure. At the start of the procedure, the value N is set to "1", which is the initial value.

With reference to FIG. 3, in the procedure, the vehicle-side controller 22 causes the memory 22*a* to store the value of the vehicle rolling code Rc stored in the memory 22*a* as a reference rolling code Rb (Step S11). Following Step S11, the vehicle-side controller 22 performs the above-described authentication procedure based on the identification code and the rolling code included in the wireless signal received through the receiver 21 and determines whether the portable device 10 has been authenticated (Step S12). When it is determined that the portable device 10 has been authenticated (Step S12: YES), the vehicle-side controller 22 updates the vehicle rolling code Rc by the value of the portable device Then, in Step S14, the vehicle-side controller 22 increments rolling code Rp included in the wireless signal (Step S13). the value N and determines whether the value N has reached the value n (Step S15). If it is determined that the value N has not reached the value n (Step S15: NO), the vehicle-side controller 22 determines whether a subsequent wireless signal is received before a predetermined period Ta elapses after the previous wireless signal has been received (Step S16). If it is determined that the subsequent wireless signal is received before the predetermined period Ta elapses (Step S16: YES), the vehicle-side controller 22 performs the aforementioned determination in Step S12. Also, if the subsequent wireless signal is received before the predetermined period Ta elapses after the previous wireless signal has been received (Step S16: YES), the portable device 10 is authenticated for each of the received wireless signals (Step S12: YES), and the value N reaches the value n (Step S15: YES), the vehicle-side controller 22 locks or unlocks the vehicle doors (Step S17).

In contrast, when the value N is less than the value n (Step S15: NO) and the portable device 10 is not authenticated (Step S12: NO) or the subsequent wireless signal is not received before the predetermined period Ta elapses after the previous wireless signal has been received (Step S16: NO), the vehicle-side controller 22 carries out a procedure for unlawful entry preventing operation (Step S18). In the procedure for the unlawful entry preventing operation, processing for temporarily prohibiting locking and unlocking of the vehicle doors, for example, is carried out to lock the system. As an unlawful entry preventing operation, a procedure for temporarily prohibiting only unlocking of the vehicle doors may be executed. Alternatively, in a case where the vehicle doors are unlocked, a procedure may be executed as an unlawful entry prevention operation in which the vehicle doors are forcibly locked and locking of the vehicle doors are temporarily prohibited to lock the system. Following Step S18, the vehicle-side controller 22 returns the value of the vehicle rolling code Rc to the value of the reference rolling code Rb (Step S19).

Figure 4:
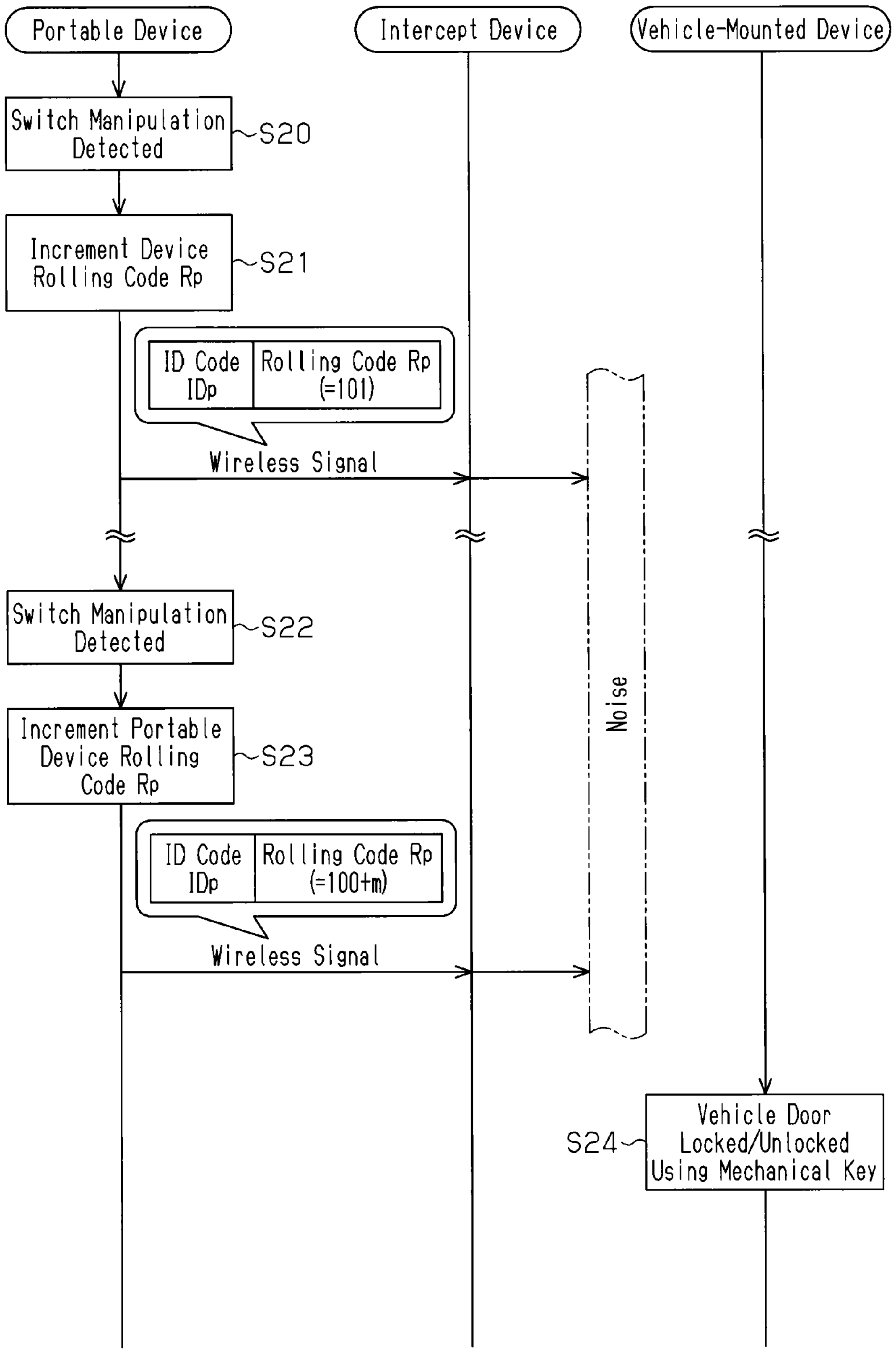
FIG. 4 is a sequence chart representing an example of operation of the wireless communication system for a vehicle according to the first embodiment.
Figure 5:
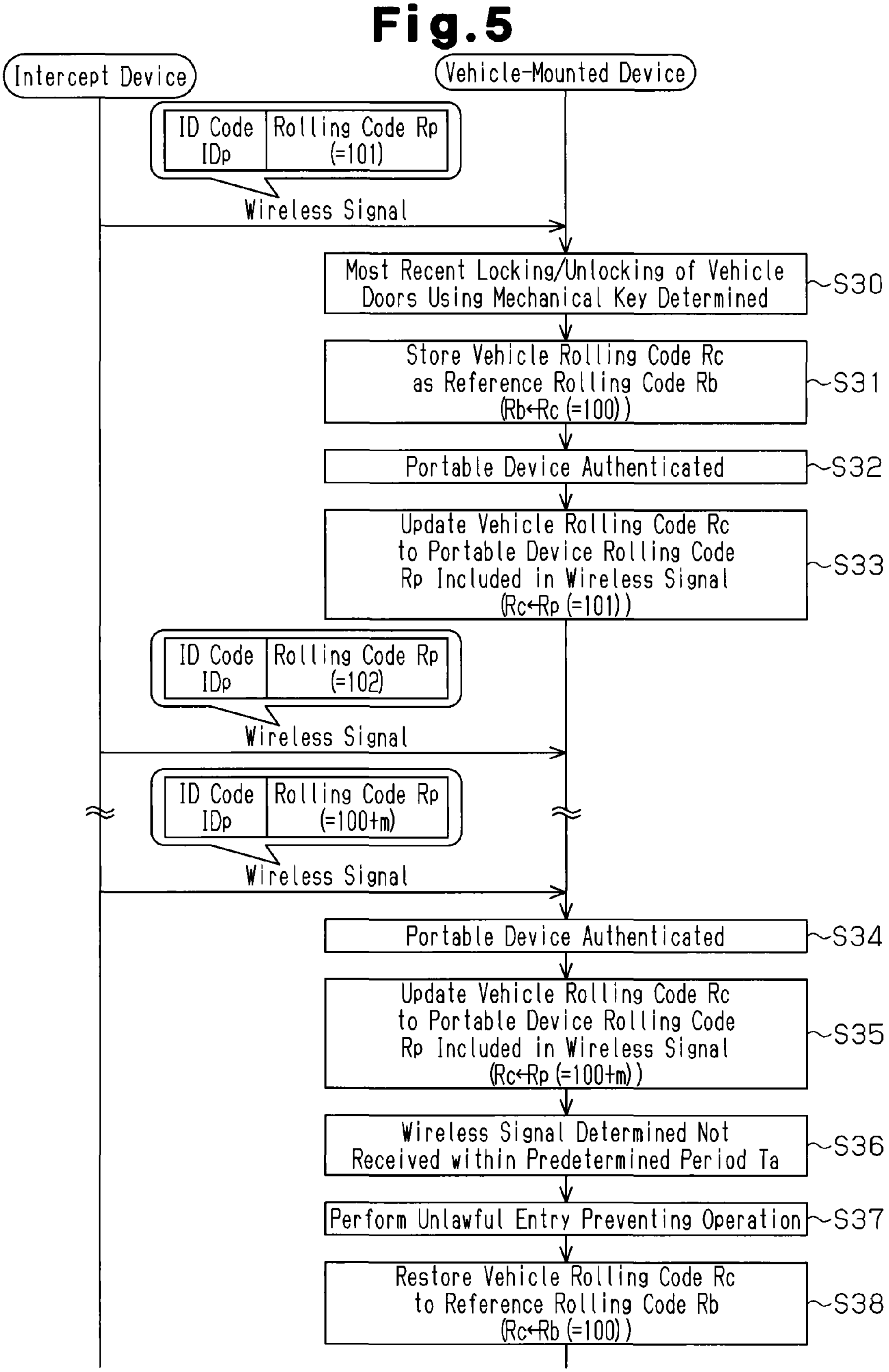
FIG. 5 is a sequence chart representing another example of operation of the wireless communication system for a vehicle according to the first embodiment.

With reference to FIGS. 4 and 5, prevention of unlawful unlocking of the vehicle doors by a third-party through the foregoing procedure will be described. FIG. 4 illustrates a case in which the portable device rolling code Rp and the vehicle rolling code Rc are both set to "100" as the initial values. The value n is greater than the value m.

If the user turns on the switch 11 of the portable device 10 under noise, the vehicle doors cannot be locked or unlocked. In this case, the user may misguidedly suspect that there is a malfunction in the portable device 10 and repeatedly turn on the switch 11 for m times. In this state, with reference to FIG. 4, each time it is detected that the switch 11 has been turned on in the portable device 10 (Steps S20 and S22), the value of the portable device rolling code Rp is incremented (Steps S21 and S23) and a wireless signal including the portable device rolling code Rp and the portable device identification code IDp is transmitted. In other words, the portable device 10 transmits a wireless signal including the portable device rolling code Rp in the range of "$101 \leq Rp \leq 100+m$" each time. As a result, if a third-party intercepts the wireless signal from the portable device 10 using an intercept device, the third-party acquires the wireless signal including the portable device rolling code Rp in the range of "$101 \leq Rp \leq 100+m$". At this stage, if the user locks or unlocks the vehicle doors using the mechanical key 30 (Step S24), the vehicle rolling code Rc is maintained at "100" without being updated.

Afterwards, if the user locks the vehicle doors using the mechanical key 30 and leaves the vehicle, the third-party may attempt to unlawfully unlock the vehicle doors and transmit the intercepted wireless signal from the intercept device to the vehicle. At this stage, with reference to FIG. 5, when a wireless signal including the value "101" as the portable device rolling code Rp is received in the vehicle-mounted device 20, it is determined that the most recent locking or unlocking of the vehicle doors has been accomplished using the mechanical key 30 (Step S30). At this point, the current value (="100") of the vehicle rolling code Rc is stored in the memory **22*a* as the reference rolling code Rb (Step S31). Then, when the portable device 10 is authenticated (Step S32), the vehicle rolling code Rc is updated to the value (="101") of the portable device rolling code Rp carried by the wireless signal (Step S33). Afterwards, each time the wireless signal including a value in the range of "$102 \leq Rp \leq 100+m$" as the portable device rolling code Rp is received in the vehicle-mounted device 20, the portable device 10 is authenticated and the vehicle rolling code Rc is updated. If the portable device 10 is authenticated (Step S34) when a wireless signal including the value "100+m" as the portable device rolling code Rp is received, the vehicle rolling code Rc is updated to the value (="100+m") of the portable device rolling code Rp included in the wireless signal (S35). This prevents a subsequent wireless signal from being received. Accordingly, it is determined that a wireless signal cannot be received in the predetermined period Ta (Step S36) in the vehicle-mounted device 20. The procedure for the unlawful entry preventing operation is then carried out as has been described (Step S37**). This temporarily prohibits the vehicle doors from being locked or unlocked, thus reliably preventing the third-party from entering the passenger compartment.

After the procedure for the unlawful entry preventing operation is carried out, the vehicle rolling code Rc is returned to the value of the reference rolling code Rb (Step S38) in the vehicle-mounted device 20. Accordingly, when the user manipulates the switch 11 for n times or more afterwards, the vehicle doors are locked or unlocked properly.

As has been described, the wireless communication system of the first embodiment has the advantages described below.

(1) If it is determined that the most recent locking or unlocking of the vehicle doors has been carried out using the mechanical key 30 when a wireless signal is received through the receiver 21, the vehicle doors are locked or unlocked if the switch 11 is turned on for n times or more. This prevents a third-party from unlawfully unlocking the vehicle doors, thus ensuring a high level of security for the vehicle. Specifically, as the value n becomes greater, it becomes more difficult for a third-party to unlock the vehicle doors using a wireless signal that has been unlawfully acquired. The level of security for the vehicle is thus improved.

(2) If it is determined that the most recent locking or unlocking of the vehicle doors has been performed using the mechanical key 30, the unlawful entry preventing operation is carried out to prevent a third-party from entering the passenger compartment unless the switch 11 is turned on n times or more. This ensures execution of the unlawful entry preventing operation when there is a likelihood that the third-party has transmitted an unlawfully acquired wireless signal to the vehicle. The third-party is thus reliably prevented from entering the passenger compartment. As a result, the level of security for the vehicle is heightened.

(3) The user turns on the switch 11 n times or more as the specific manipulation that must be performed by the user in order to lock or unlock the vehicle doors after the most recent locking or unlocking of the vehicle doors has been performed using the mechanical key 30. Accordingly, as long as the value n is greater than the value m, which is the number of times by which the user turns on the switch 11 after failing to lock or unlock the vehicle doors despite that the user has turned on the switch 11, the vehicle doors cannot be unlocked simply by means of a wireless signal that has been unlawfully acquired by a third-party. This prevents the third-party from unlawfully unlocking the vehicle doors, thus improving the level of security for the vehicle.

(4) As the unlawful entry preventing operation, the vehicle doors are temporarily prohibited from being locked or unlocked. This reliably prevents a third-party from entering the passenger compartment, thus effectively heightening the level of security for the vehicle.

(5) If it is detected that the vehicle doors have been locked or unlocked despite the fact that locking or unlocking of the vehicle doors through authentication of the portable device 10 has not been carried out, it is determined that the vehicle doors have been locked or unlocked using the mechanical key 30. In this manner, it is determined whether locking or unlocking of the vehicle doors has been carried out using the mechanical key 30 only by employing the door lock position sensor 23. This makes it unnecessary to mount a dedicated sensor for detecting whether locking or unlocking of the vehicle doors has been carried out using the mechanical key 30 in the vehicle-mounted device 20. As a result, the cost necessary for the wireless communication system is decreased.

(First Modification)

A first modification of the wireless communication system for a vehicle according to the first embodiment will now be described with reference to FIG. 3.

In the present modification, the predetermined period Ta in the determination of Step S16 of the aforementioned procedure represented in FIG. 3 is set to an extremely short period compared to the predetermined period Ta in the first embodiment. Specifically, the predetermined period Ta in the modification is set to the period corresponding to the time span in which the switch is turned on at the period when the user turns on the switch 11 quickly and consecutively. Accordingly, after the most recent locking or unlocking of the vehicle doors has been accomplished using the mechanical key 30, the vehicle doors are locked or unlocked by the vehicle-mounted device 20 if the switch 11 is turned on quickly for n consecutive times. Since such consecutive quick manipulation of the switch 11 by the user is unusual, a wireless signal corresponding to the manipulation is prevented from being intercepted by a third-party. This prevents the third-party from faking the specific manipulation using an unlawfully acquired wireless signal and thus unlawfully unlocking the vehicle doors. The level of security for the vehicle is thus improved.

(Second Modification)

Figure 6:
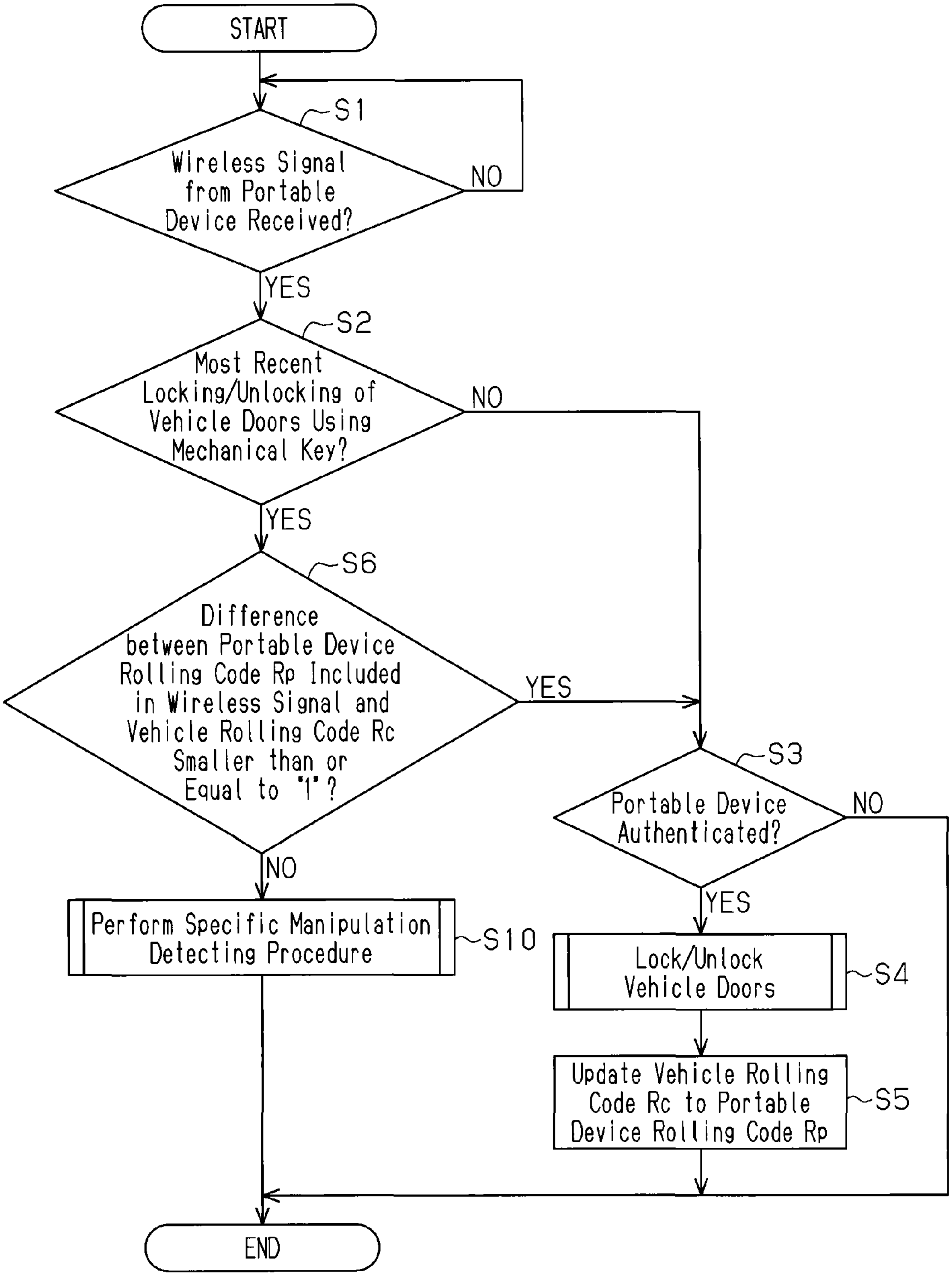
FIG. 6 is a flowchart representing the steps of a procedure for selectively locking and unlocking vehicle doors in response to a wireless signal transmitted from the portable device of a second modification of the wireless communication system for a vehicle according to the first embodiment.

FIG. 6 shows a second modification of the wireless communication system for a vehicle according to the first embodiment.

As has been described, when the vehicle-side controller 22 receives a wireless signal through the receiver 21 after the most recent locking or unlocking of the vehicle doors has been carried out using the mechanical key 30, the vehicle doors are locked or unlocked if the switch 11 of the portable device 10 is manipulated for n times or more. This ensures improvement of the level of security for the vehicle. However, after the user locks or unlocks the vehicle doors using the mechanical key 30, the user must turn on the switch 11 of the portable device 10 for n times or more when the user intends to lock or unlock the vehicle doors for the next time. Operation by the user is thus burdensome. To solve this problem, in the second modification, as represented in FIG. 6, when it is determined that the most recent locking or unlocking of the vehicle doors has been performed using the mechanical key 30 (Step S2: YES), the vehicle-side controller 22 determines whether the difference between the portable device rolling code Rp included in the wireless signal and the vehicle rolling code Rc is smaller than or equal to “1” (Step S6). When it is determined that the aforementioned difference is smaller than or equal to “1” (Step S6: YES), the vehicle-side controller 22 locks or unlocks the vehicle doors (Step S4) and updates the vehicle rolling code Rc (Step S5) after authenticating the portable device 10 in accordance with the normal procedure (Step S3). In contrast, if it is determined that the difference between the rolling codes Rp and Rc is greater than “1” (Step S6: NO), the vehicle-side controller 22 performs the aforementioned specific manipulation detecting procedure (Step S10). In this manner, when the user turns on the switch 11 of the portable device 10, the portable device 10 normally transmits a wireless signal including the portable device rolling code Rp that is greater than the vehicle rolling code Rc by “1”. Accordingly, by turning on the switch 11 only once, the user is allowed to lock or unlock the vehicle doors. This facilitates operation by a user.

<Second Embodiment>

A wireless communication system for a vehicle according to a second embodiment of the present invention will hereafter be described with reference to FIG. 7, in addition to FIG. 1.

In the second embodiment, when the vehicle-side controller 22 receives a wireless signal through the receiver 21 after the most recent locking or unlocking of the vehicle doors has been carried out using the mechanical key 30 and noise has been received through the receiver 21 in the most recent locking or unlocking, the vehicle doors are locked or unlocked if the switch 11 is turned on n times or more. The basic configuration of the wireless communication system according to the second embodiment is similar to the configuration illustrated in FIG. 1. The second embodiment will hereafter be described mainly with respect to the differences between the second embodiment and the first embodiment.

In the second embodiment, as indicated by the double-dotted chain lines in FIG. 1, the vehicle-side controller 22 has an RSSI circuit 21*a* for detecting the intensity of a wireless signal received through the receiver 21. The RSSI circuit 21*a* corresponds to the signal intensity detecting section. The vehicle-side controller 22 constantly monitors the outputs of the RSSI circuit 21*a*. When it is detected that the vehicle doors have been locked or unlocked using the mechanical key 30, the vehicle-side controller 22 determines whether noise has been received through the receiver 21. In other words, the vehicle-side controller 22 detects reception of noise using chronological data representing the signal intensity detected through the RSSI circuit 21*a* in the period from the time corresponding to detection that the vehicle doors have been locked or unlocked using the mechanical key 30 to the period after a predetermined period. Specifically, the vehicle-side controller 22 determines that noise has been received through the receiver 21 if the maximum value in the chronological data representing the signal intensity is greater than or equal to the predetermined signal intensity Si. When the vehicle-side controller 22 determines that noise has been received through the receiver 21 at the period of locking or unlocking of the vehicle doors using the mechanical key 30, the vehicle-side controller 22 sets a noise determination flag, which is stored in the memory 22*a,* to an ON state. In contrast, if the vehicle-side controller 22 determines that the vehicle doors have been locked or unlocked using the mechanical key 30 without receiving noise through the receiver 21, the vehicle-side controller 22 sets the noise determination flag to an OFF state. If the noise determination flag is in the ON state when the vehicle-side controller 22 receives a wireless signal through the receiver 21, the vehicle-side controller 22 determines that noise has been received through the receiver 21 in the most recent locking or unlocking of the vehicle doors.

Figure 7:
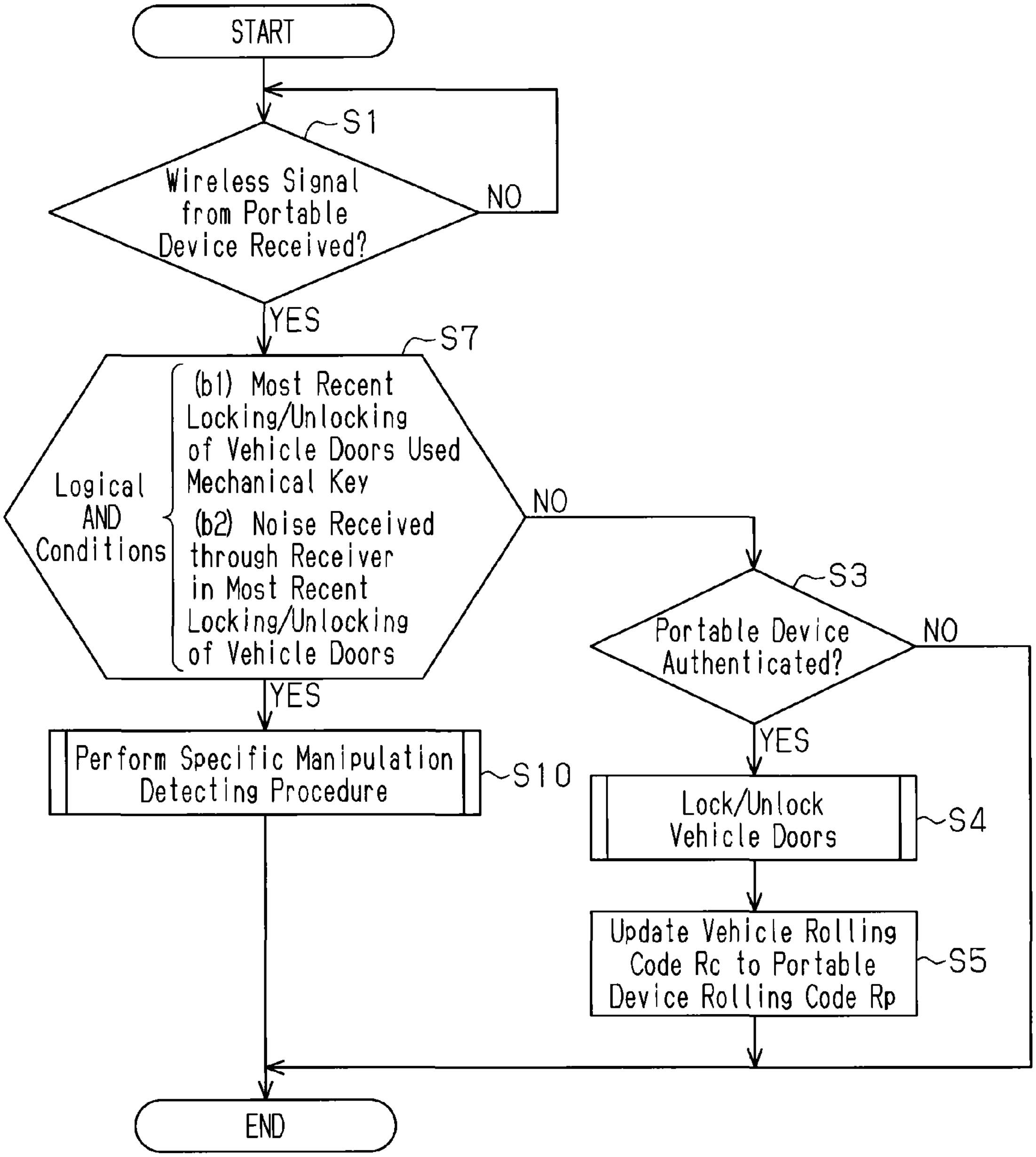
FIG. 7 is a flowchart representing the steps of a procedure for selectively locking and unlocking vehicle doors in response to a wireless signal transmitted from the portable device of a wireless communication system for a vehicle according to a second embodiment of the invention.

Then, based on such determination, the vehicle-side controller 22 executes the procedure illustrated in FIG. 7.

FIG. 7 corresponds to FIG. 2 and is a flowchart representing the steps of a procedure for locking or unlocking the vehicle doors performed by the vehicle-side controller 22. Same or like reference numerals are given to steps of the procedure in FIG. 7 that are the same as or like corresponding steps of the procedure in FIG. 2. Description of the steps will be omitted herein for the purpose of avoiding redundancy.

With reference to FIG. 7, in the procedure, when it is determined that a wireless signal transmitted from the portable device 10 has been received through the receiver 21 (Step S1: YES), the vehicle-side controller 22 determines whether the conditions (b1) and (b2) are satisfied based on the aforementioned door open/close flag and the noise determination flag (Step S7).

(b1) The most recent locking or unlocking of the vehicle doors has been performed using the mechanical key 30.

(b2) Noise has been received through the receiver 21 in the most recent locking or unlocking of the vehicle doors.

When it is determined that the conditions (b1) and (b2) are both satisfied (Step S7: YES), the vehicle-side controller 22 performs the aforementioned specific manipulation detecting procedure (Step S10). In contrast, when it is determined that neither the condition (b1) nor the condition (b2) is satisfied (Step S7: NO), the vehicle-side controller 22 locks or unlocks the vehicle doors (Step S4) and updates the vehicle rolling code Rc (Step S5) if the portable device 10 is authenticated (Step S3: YES).

In this manner, it is accurately determined whether noise has been received through the receiver 21 in locking or unlocking of the vehicle doors using the mechanical key 30, or, in other words, whether there is a likelihood that the vehicle doors are to be unlawfully unlocked using a wireless signal that has been intercepted in the aforementioned manner. This further reliably prevents a third-party from unlawfully unlocking the vehicle doors.

As has been described, the wireless communication system for a vehicle according to the second embodiment has the advantages that are the same as or similar to the advantages (2) to (5) of the first embodiment and the advantage described below for replacement of the advantage (1).

(1') If it is determined that the most recent locking or unlocking of the vehicle doors has been performed using the mechanical key 30 and that noise has been received through the receiver 21 in the most recent locking or unlocking of the vehicle doors when the vehicle-side controller 22 receives a wireless signal through the receiver 21, the vehicle doors are locked or unlocked if the switch 11 is turned on n times or more. This ensures accurate determination whether there is a likelihood that the vehicle doors are to be unlawfully unlocked through interception of a wireless signal. As a result, a third-party is prevented further reliably from unlawfully unlocking the vehicle doors.

<Third Embodiment>

A wireless communication system for a vehicle according to a third embodiment of the present invention will now be described with reference to FIG. 8, in addition to FIG. 1.

In the third embodiment, when the vehicle-side controller 22 receives a wireless signal through the receiver 21 after the most recent locking or unlocking of the vehicle doors has been accomplished using the mechanical key 30, the vehicle-side controller 22 causes a hazard lamp to flash or a horn to honk in the vehicle if the portable device 10 is authenticated. Through such an informing operation, such as the flashing of the hazard lamp or the honking of horn, the vehicle-side controller 22 urges the user to carry out a specific manipulation with respect to the portable device 10. In the third embodiment, the hazard lamp and the horn each correspond to the informing section. After flashing of the hazard lamp or honking of the horn, the vehicle-side controller 22 locks or unlocks the vehicle door if the user performs the specific manipulation on the switch 11. As the specific manipulation, any suitable unusual manipulation carried out on the switch 11 may be employed, including continuous depression of the switch 11 for a predetermined period or manipulation of the switch 11 in accordance with a pattern corresponding to a prescribed Morse code, in addition to the above described repeated depression of the switch 11 for n periods. The basic configuration for the wireless communication system according to the third embodiment is similar to the configuration illustrated in FIG. 1. The third embodiment will hereafter be described mainly regarding the differences between the third embodiment and the first embodiment.

As illustrated in FIG. 1, when the portable device controller 12 of the third embodiment detects that the specific manipulation has been performed on the switch 11 of the portable device 10, the portable device controller 12 produces a specific manipulation detecting signal indicating the specific manipulation and transmits the specific manipulation detecting signal from the transmitter 13.

On the other hand, the vehicle-side controller 22 of the third embodiment determines that the specific manipulation has been carried out on the switch 11 in response to the specific manipulation detecting signal received through the receiver 21. Based on such determination, the vehicle-side controller 22 executes the specific manipulation detecting procedure represented in FIG. 8.

Figure 8:
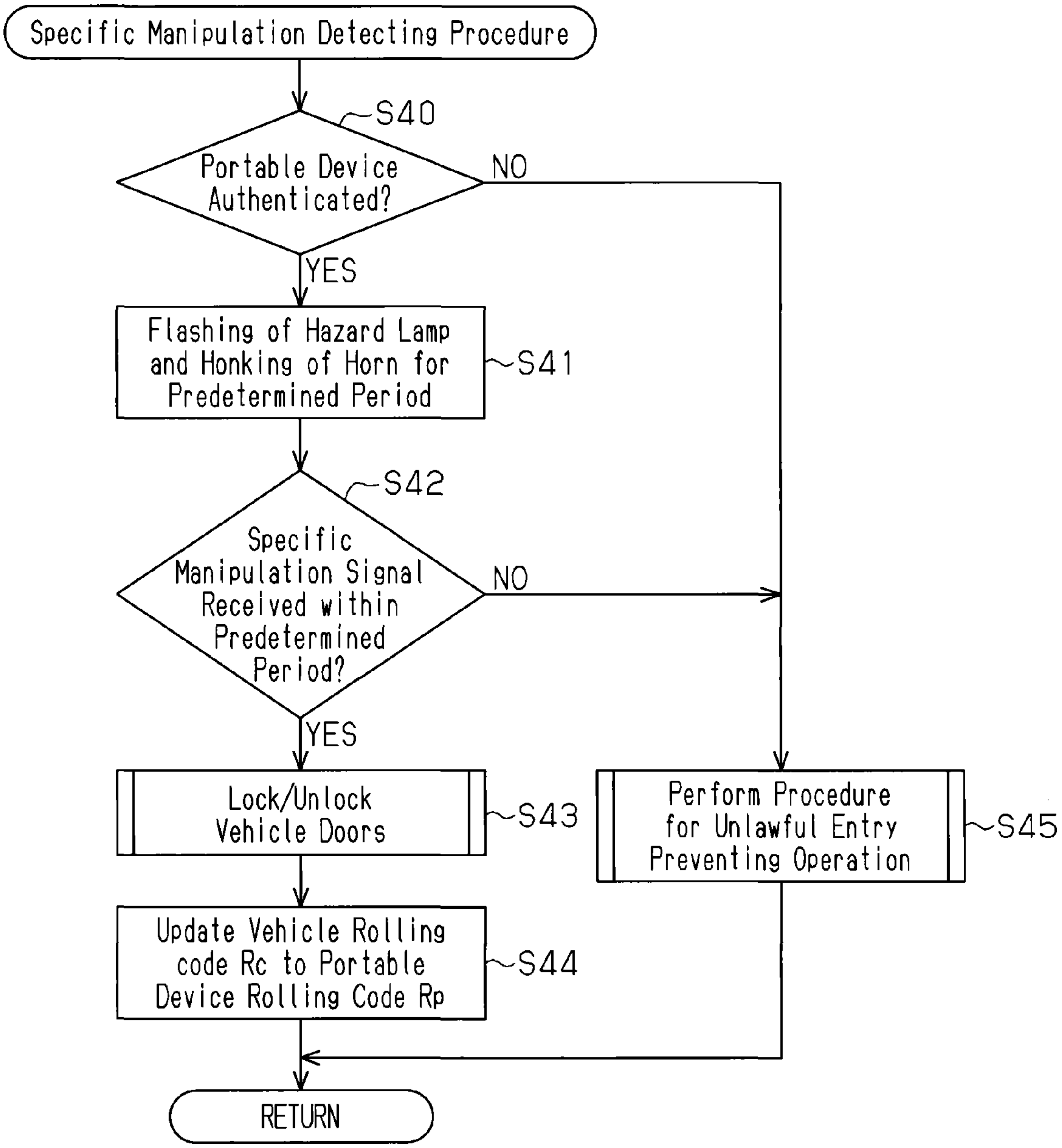
FIG. 8 is a flowchart representing the steps of a specific manipulation detecting procedure carried out by a wireless communication system for a vehicle according to a third embodiment of the invention.

FIG. 8 corresponds to FIG. 3 and is a flowchart representing the steps of the specific manipulation detecting procedure, which is performed through the vehicle-side controller 22.

With reference to FIG. 8, in the procedure, the vehicle-side controller 22 performs the aforementioned authentication procedure based on the identification code and the rolling code included in the wireless signal received through the receiver 21 and determines whether the portable device 10 is authenticated (Step S40). When it is determined that the portable device 10 is authenticated (Step S40: YES), the vehicle-side controller 22 causes a hazard lamp to flash for a predetermined period and a horn to honk (Step S41), thus urging the user to perform the specific manipulation. The vehicle-side controller 22 determines whether a specific manipulation signal has been received through the receiver 21 in the period from the period corresponding to completion of flashing of the hazard lamp and honking of the horn for a period after a predetermined period (Step S42). If it is determined that a specific manipulation signal has been received (Step 42: YES), the vehicle-side controller 22 locks or unlocks the vehicle doors (Step S43). The vehicle-side controller 22 then updates the vehicle rolling code Rc to the value of the portable device rolling code Rp carried by the wireless signal (Step S44).

Contrastingly, if the portable device 10 is not authenticated (Step S40: NO) or a specific manipulation signal has not been received (Step S42: NO), the vehicle-side controller 22 performs the procedure for the aforementioned unlawful entry preventing operation (Step S45).

In this manner, the user performs the specific manipulation on the switch 11 in response to the informing operation such as flashing of the hazard lamp or honking of the horn. This allows the user to easily know the timing for carrying out the specific manipulation, thus facilitating the operation by the user.

As has been described, the wireless communication system for a vehicle according to the third embodiment has advantages that are the same as or similar to the advantages (1) to (5) and the advantage described below.

(6) If it is determined that the most recent locking or unlocking of the vehicle doors has been carried out using the mechanical key 30 when the vehicle-side controller 22 receives a wireless signal through the receiver 21, a hazard lamp flashes or a horn honks if the portable device 10 is authenticated. This allows the user to easily know the timing for the specific manipulation, thus facilitating operation by a user.

<Fourth Embodiment>

Next, a wireless communication system for a vehicle of a fourth embodiment according to the present invention will be described with reference to FIGS. 9 to 11. The basic configuration of the wireless communication system of the fourth embodiment is similar to the configuration illustrated in FIG. 1. The fourth embodiment will hereafter be described mainly regarding the differences between the fourth embodiment and the second embodiment.

In the fourth embodiment, when the vehicle-side controller 22 receives a wireless signal through the receiver 21 after the most recent locking or unlocking of the vehicle doors has been performed using the mechanical key 30 and noise has been received in the most recent locking or unlocking, the vehicle rolling code Rc is updated by incremented the vehicle rolling code Rc by a predetermined update value Ra (an integral number greater than or equal to 2).

Figure 9:
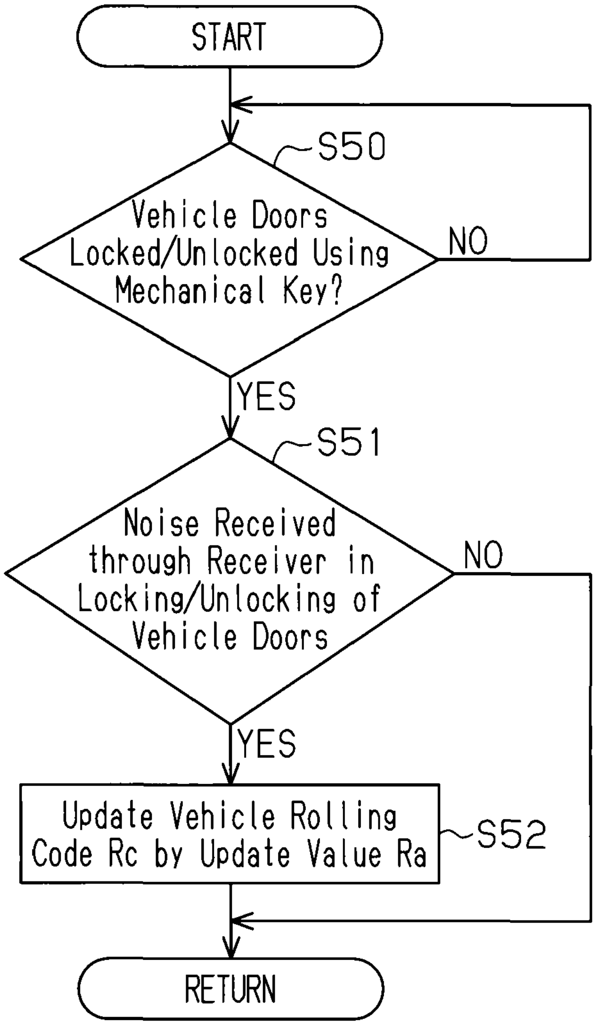
FIG. 9 is a flowchart representing the steps of a procedure for updating a vehicle rolling code carried out by a wireless communication system for a vehicle according to a fourth embodiment of the invention.

FIG. 9 is a flowchart representing the steps of an updating procedure for the vehicle rolling code Rc, which is performed through the vehicle-side controller 22. The steps of the procedure will hereafter be described in detail with reference to FIG. 9. The procedure is carried out repeatedly at predetermined calculation cycles.

As represented by FIG. 9, in the procedure, the vehicle-side controller 22 monitors whether the vehicle doors have been locked or unlocked using the mechanical key 30 based on an output from the door lock position sensor 23 (Step S50). When it is detected that the vehicle doors have been locked or unlocked using the mechanical key 30 (Step S50: YES), the vehicle-side controller 22 determines whether noise has been received through the receiver 21 (Step S51). In the processing of Step S51, as in the second embodiment, the vehicle-side controller 22 determines whether noise has been received through the receiver 21 using chronological data representing the signal intensity that is detected through the RSSI circuit 21*a* in a predetermined period after detection that the vehicle doors have been locked or unlocked using the mechanical key 30. If it is determined that noise has been received through the receiver 21 (Step S51: YES), the vehicle-side controller 22 updates the vehicle rolling code Rc by incrementing the vehicle rolling code Rc by the update value Ra (Step S52) and ends the series of procedure.

In contrast, when it is determined that noise has not been received through the receiver 21 (Step S51: NO), the vehicle-side controller 22 ends the series of procedure without updating the vehicle rolling code Rc.

The fourth embodiment includes neither processing in Step S7 nor processing in Step S10 from the procedure represented by FIG. 7. In other words, when the vehicle-side controller 22 detects that a wireless signal transmitted from the portable device 10 has been received, the vehicle-side controller 22 determines whether the portable device 10 is authenticated based on the received wireless signal. If the portable device 10 is authenticated, the vehicle-side controller 22 locks or unlocks the vehicle doors and updates the vehicle rolling code Rc to the portable device rolling code Rp included in the wireless signal.

Figure 10:
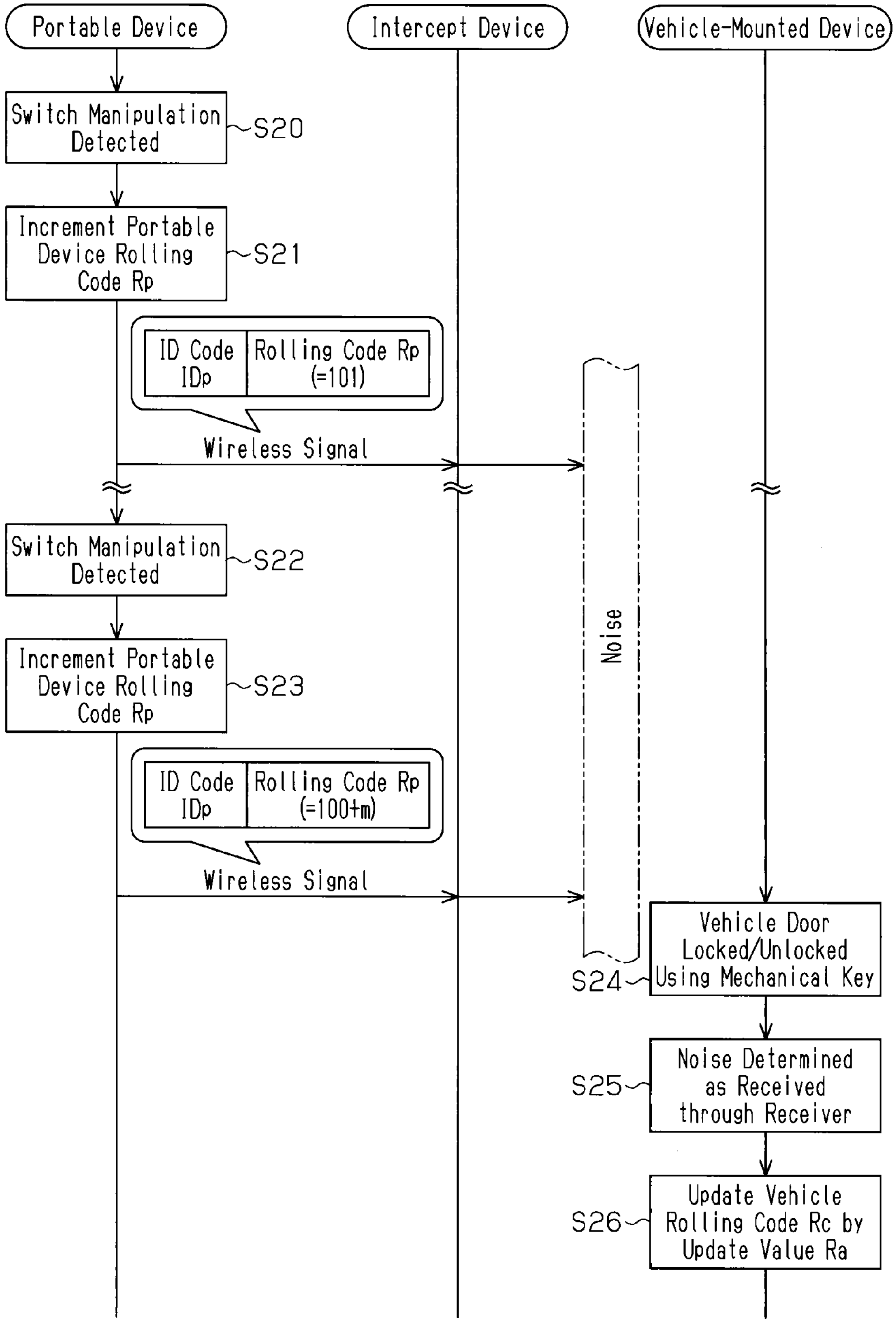
FIG. 10 is a sequence chart representing an example of operation of the wireless communication system for a vehicle according to the fourth embodiment.
Figure 11:
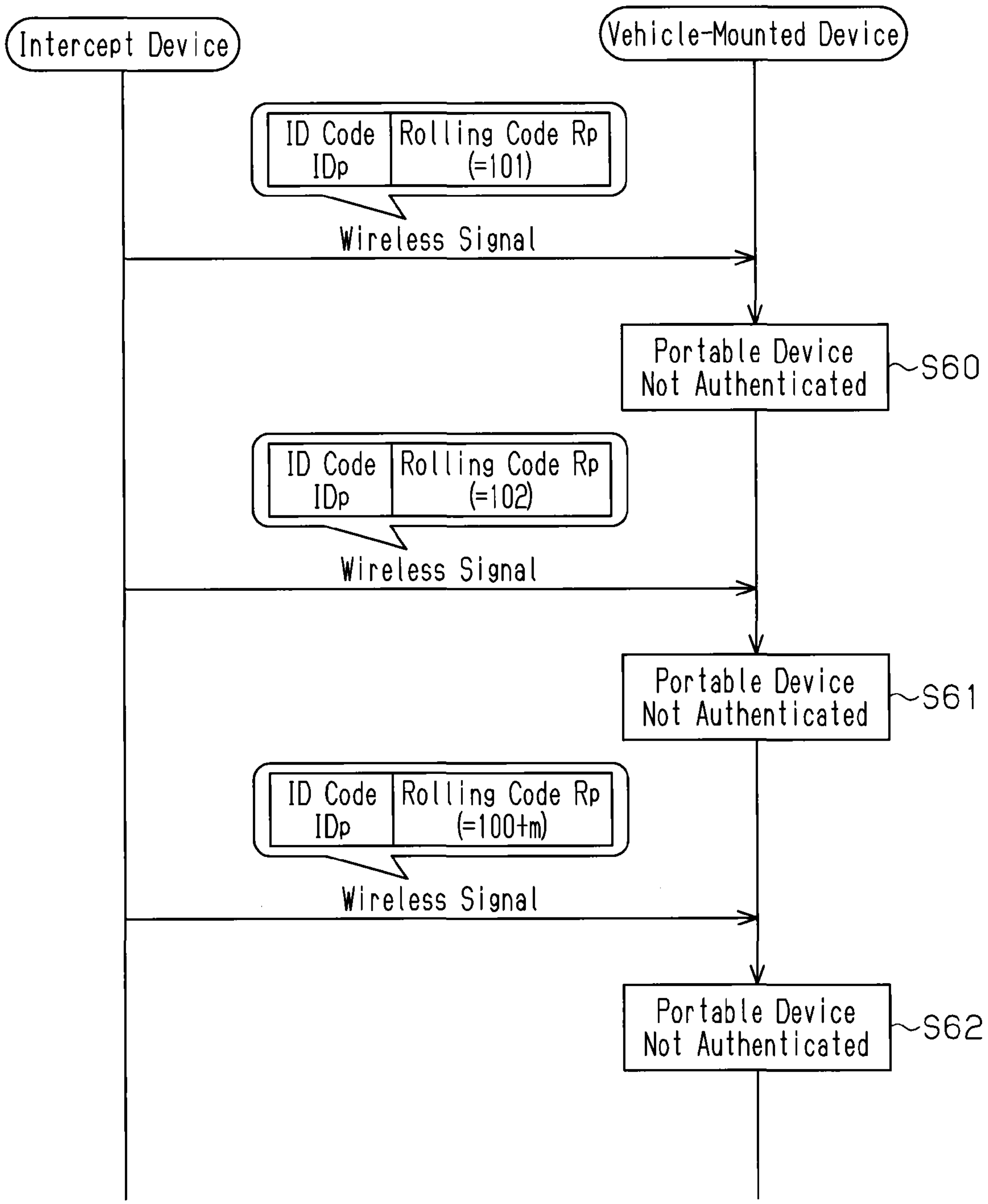
FIG. 11 is a sequence chart representing another example of operation of the wireless communication system for a vehicle according to the fourth embodiment.

With reference to FIGS. 10 and 11, prevention of unlawful unlocking of the vehicle doors by a third-party through the procedure will now be described. Same or like reference numerals are given to steps in the procedure in FIG. 10 that are the same as or like corresponding steps in the procedure in FIG. 4. Description of the steps will be omitted for the purpose of avoiding redundancy. The update value Ra is greater than the value m.

For example, after a third-party intercepts a wireless signal including the portable device rolling code Rp in the range of "101≤Rc≤100+m", the user locks or unlocks the vehicle doors using the mechanical key 30 (Step S24), with reference to FIG. 10. At this stage, if it is determined that noise is received through the receiver 21 (Step S25) in the vehicle-mounted device 20, the vehicle rolling code Rc is updated by incrementing the vehicle rolling code Rc by the update value Ra (Step S26). In other words, the vehicle rolling code Rc is set to "100+Ra".

Then, after the user locks the vehicle doors using the mechanical key 30 and leaves the vehicle, the third-party transmits the intercepted wireless signal from the intercept device to the vehicle, attempting to unlawfully unlock the vehicle doors. In this state, with reference to FIG. 11, the portable device rolling code Rp included in the wireless signal from the intercept device is in the range of "101≤Rc≤100+m" and smaller than the vehicle rolling code Rc (=100+Ra). Accordingly, in the vehicle-mounted device 20, authentication of the portable device 10 is prevented from being achieved each time the wireless signal is transmitted (Steps S60, S61, and S62). This prevents the third-party from unlawfully unlocking the vehicle doors, thus ensuring a high level of security for the vehicle.

To lock or unlock the vehicle doors using the portable device 10 afterwards, the user turns on the switch 11 for "Ra+1" times or more. In this manner, a wireless signal including the value "100+Ra+1" as the portable device rolling code Rp is transmitted from the portable device 10. The portable device 10 is thus authenticated in the vehicle-mounted device 20. As a result, the vehicle doors are locked or unlocked.

As has been described, the wireless communication system for a vehicle according to the fourth embodiment has the advantage described below.

(7) When the vehicle doors are locked or unlocked using the mechanical key 30, the vehicle-side controller 22 updates the vehicle rolling code Rc by incrementing the vehicle rolling code Rc by the update value Ra if noise is received through the receiver 21. This prevents a third-party from unlawfully unlocking the vehicle doors, thus preventing a high level of security.

<Other Embodiments>

The illustrated embodiments and related modifications may be changed as needed in the forms described below.

In the modification of the first embodiment, in Step S6 of the procedure in FIG. 6, the vehicle-side controller 22 may determine whether the difference between the portable device rolling code Rp included in the wirelessly transmitted signal and the vehicle rolling code Rc is smaller than or equal to a predetermined value. When it is determined that the difference between the rolling codes Rp and Rc is smaller than or equal to the predetermined value, the vehicle-side controller 22 locks or unlocks the vehicle doors (Step S4) and updates the vehicle rolling code Rc (Step S5) after authenticating the portable device 10 in accordance with the normal procedure (Step S3). In contrast, if it is determined that the difference between the rolling codes Rp and Rc is greater than the predetermined value, the vehicle-side controller 22 performs the specific manipulation detecting procedure (Step S10). Accordingly, even after the user turns on the switch 11 at a position away from the vehicle and thus the portable rolling code Rp is updated, the user may lock or unlock the vehicle doors simply by turning on the switch 11 only one time when he comes back to a position close to the vehicle, as long as the difference between the rolling codes Rp and Rc remains smaller than or equal to the predetermined value. This facilitates operation by a user.

In the first to third embodiments and related modifications, the vehicle doors are temporarily prohibited from being locked or unlocked as the unlawful entry preventing operation. However, instead of this, warning may be given to a third-party, for example, through a warning section mounted in the vehicle. Specifically, the third-party may be warned by flashing of hazard lamp or honking of horn in the vehicle.

Processing in Steps S18 or S45, which is the procedure for the unlawful entry preventing operation, may be omitted from the specific manipulation detecting procedure represented in FIGS. 3 and 8. Even in this case, the vehicle doors are prevented from being unlawfully unlocked using an intercepted wireless signal. A high level of security is thus ensured for the vehicle.

In the third embodiment, the procedure represented in FIG. 8 does not necessarily have to include processing in Step S41, which is flashing of the hazard lamp and honking of the horn for the predetermined period.

In the fourth embodiment, the procedure represented in FIG. 9 does not necessarily have to include processing in Step S51. In other words, in this case, when it is determined that the vehicle doors have been locked or unlocked using the mechanical key 30 (Step S50: YES), the vehicle-side controller 22 may update the vehicle rolling code Rc by incrementing the vehicle rolling code Rc by the update value Ra (Step S52). Even in this manner, an advantage similar to the advantage (7) can be obtained.

In the illustrated embodiments, the door lock position sensor 23 is used for determination whether the vehicle doors have been locked or unlocked using the mechanical key 30. However, such determination may be carried out using, for example, a door courtesy switch for detecting an open/close state of a vehicle door or a sensor for detecting the actuation state of a solenoid (a door lock motor) that operates to lock or unlock the vehicle doors. Specifically, in the case employing the door courtesy switch, when it is detected that the vehicle door has been opened or closed through the door courtesy switch despite the fact that authentication of the portable device 10 has not been performed to unlock the vehicle doors, the vehicle-side controller 22 determines that the vehicle doors have been unlocked using the mechanical key 30. Alternatively, in the case using the sensor for detecting the actuation state of the solenoid, when it is detected that the vehicle doors have been locked or unlocked through the door lock position sensor 23 despite the fact that the solenoid has not been actuated to lock or unlock the vehicle doors, the vehicle-side controller 22 determines that the vehicle doors have been locked or unlocked using the mechanical key 30.

In the illustrated embodiments and related modifications, manipulation of the switch 11 in a certain manner is employed as the specific manipulation. However, for example, in a portable device having two switches, which are a lock switch for locking the vehicle doors and an unlock switch for unlocking the vehicle doors, the specific manipulation may be simultaneous or alternate depression of the two switch. Alternatively, in a portable device including a power back door open/close switch for selectively opening and closing the back door of the vehicle, the power back door open/close switch may be manipulated in a certain manner as the specific manipulation.

Therefore, the present examples and embodiments are to be considered as illustrative and not restrictive and the invention is not to be limited to the details given herein, but may be modified within the scope and equivalence of the appended claims.

The invention claimed is:

1. A wireless communication system for a vehicle for locking or unlocking a vehicle door, the system comprising:

a portable device having a manually operable switch and a portable device rolling code, wherein, each time the switch is turned on, the portable device updates the portable device rolling code and transmits a wireless signal including the portable device rolling code, the portable device is adapted to manually operate in two ways including a normal operation exclusively for turning on the switch to lock or unlock the vehicle door and a specific manipulation effective for a limited time period, the specific manipulation exclusively for security purposes and performed in order to transmit information indicating the specific manipulation has been performed;

a vehicle-mounted device having a receiver and a vehicle rolling code, wherein, when the wireless signal is received through the receiver, the vehicle-mounted device compares the portable device rolling code included in the wireless signal with the vehicle rolling code, authenticates the portable device based on a comparison result, and locks or unlocks the vehicle door if the portable device is authenticated; and a control section mounted in the vehicle-mounted device, the control section controlling locking or unlocking of the vehicle door, wherein, when the control section receives the wireless signal through the receiver, the control section determines whether the most recent locking or unlocking of the vehicle door has been accomplished using a mechanical key and, if it is determined that the most recent locking or unlocking of the vehicle door has been carried out using the mechanical key, the control section disables an operation of locking or unlocking of the vehicle door through the normal operation of the portable device, and the control section urges a user to perform the specific manipulation, which is not usually performed on the switch, and re-enables the operation of locking or unlocking of the vehicle door if the specific manipulation of the switch of the portable device is detected within a predetermined period from when the control section urges the user to perform the specific manipulation, wherein, when the specific manipulation is carried out, the portable device transmits a wireless signal indicating that the specific manipulation has been carried out, and the control section detects the specific manipulation of the switch by receiving the wireless signal indicating that the specific manipulation has been carried out.

2. The system according to claim I, wherein, if the control section determines that the most recent locking or unlocking of the vehicle door has been performed using the mechanical key when the control section receives the wireless signal through the receiver, the control section performs an unlawful entry preventing operation for preventing a third-party from unlawfully entering a passenger compartment if the specific manipulation of the switch is not detected.

3. The system according to claim 2, wherein the control section temporarily prohibits the vehicle door from being locked or unlocked as the unlawful entry preventing operation.

4. The system according to claim 2, further comprising a warning section mounted in the vehicle, wherein the control section activates the warning section to perform a warning as the unlawful entry preventing operation.

5. The system according to claim 1, wherein, if the control section determines, at the reception of the wireless signal through the receiver, that the most recent locking or unlocking of the vehicle door has been carried out using the mechanical key and that noise has been received through the receiver during the most recent locking or unlocking of the vehicle door, the control section locks or unlocks the vehicle door if the specific manipulation of the switch is detected.

6. The system according to claim 5, further comprising a signal intensity detecting section for detecting the intensity of the wireless signal received through the receiver, wherein the control section determines whether noise has been received through the receiver during the most recent locking or unlocking of the vehicle door based on the signal intensity detected through the signal intensity detecting section in the most recent locking or unlocking of the vehicle door.

7. The system according to claim 1, further comprising a lock/unlock detecting section for detecting whether the vehicle door has been locked or unlocked, wherein the control section determines whether the vehicle door has been locked or unlocked using the mechanical key based on detection that the vehicle door has been locked or unlocked through the lock/unlock detecting section despite that authentication of the portable device has not been performed to lock or unlock the vehicle door.

8. The system according to claim 7, wherein the control device updates the vehicle rolling code by incrementing the vehicle rolling code by a predetermined value if the most recent locking or unlocking of the vehicle door has been performed using the mechanical key and noise has been received through the receiver during the most recent locking or unlocking of the vehicle door.

9. The system according to claim 1, wherein the specific manipulation of the switch includes turning on the switch for a predetermined number of times.

10. The system according to claim 1, wherein the specific manipulation of the switch includes turning on the switch consecutively.

11. The system according to claim 1, further comprising an informing section mounted in the vehicle, wherein, if the control section determines that the most recent locking or unlocking of the vehicle door has been carried out using the mechanical key when the control section receives the wireless signal through the receiver, the control section performs informing through the informing section if the portable device is authenticated.

12. The system according to claim 1, wherein, if the control section determines, at the reception of the wireless signal through the receiver, that the most recent locking or unlocking of the vehicle door has been carried out using the mechanical key, the control section locks or unlocks the vehicle door if the difference between the portable device rolling code included in the wireless signal received through the receiver and the vehicle rolling code is smaller than or equal to a predetermined value.

13. The system according to claim 1, wherein, if it is determined that the vehicle door has been locked or unlocked using the mechanical key, the control section updates the vehicle rolling code by incrementing the vehicle rolling code by a predetermined value.

* * * * *